United States Patent [19]
Dyrdek

[11] Patent Number: 5,308,247
[45] Date of Patent: May 3, 1994

[54] ELECTRICAL CONNECTOR ASSEMBLY FOR AUTOMOBILE REARVIEW MIRROR AND LIGHT ASSEMBLY AND METHOD OF ASSEMBLING THE SAME

[76] Inventor: Robert D. Dyrdek, AP Technoglass Corp./Kentucky, 1 Autoglass Dr., P.O. box 5000, Elizabethtown, Ky. 42702-5000

[21] Appl. No.: 6,983

[22] Filed: Jan. 21, 1993

[51] Int. Cl.⁵ .......................................... H01R 13/73
[52] U.S. Cl. .................................. 439/34; 248/475.1; 359/872; 439/529
[58] Field of Search ............... 439/34, 527, 529, 577, 439/929; 248/467, 475.1; 359/871-884

[56]   References Cited
   U.S. PATENT DOCUMENTS

| | | | |
|---|---|---|---|
| 3,549,785 | 12/1970 | Timko, Jr. et al. | 174/68.5 |
| 3,947,618 | 3/1976 | Gruss | 428/49 |
| 4,029,942 | 6/1977 | Levin | 219/522 |
| 4,396,826 | 8/1983 | Orcutt et al. | 219/522 |
| 4,415,196 | 11/1983 | Baum et al. | 296/201 |
| 4,646,210 | 2/1987 | Skogler et al. | 362/142 |
| 4,808,799 | 2/1989 | Schave | 219/522 |
| 4,883,349 | 11/1989 | Mittelhauser | 248/475.1 |
| 4,888,072 | 12/1989 | Ohlenforst et al. | 156/108 |
| 4,930,742 | 6/1990 | Schofield et al. | 248/475.1 |
| 4,940,884 | 7/1990 | Gillery | 219/203 |

*Primary Examiner*—Gary F. Paumen
*Attorney, Agent, or Firm*—Vorys, Sater, Seymour & Pease

[57]   ABSTRACT

There is provided an improved electrical connector assembly and method for directly mounting electrical components, such as a rearview mirror and light assembly on a glass surface in a manner which provides electrical power to the rearview mirror and light assembly. A retaining button is provided for removably mounting a rearview mirror assembly thereon. The button has a cutout portion, preferably, arranged to receive electrical contact terminals therein. The terminals are also electrically connected by a pair of conductive strips formed in the glass pane to an external source and also to terminals of the rearview mirror and light assembly.

9 Claims, 3 Drawing Sheets

ELECTRICAL CONNECTOR ASSEMBLY FOR AUTOMOBILE REARVIEW MIRROR AND LIGHT ASSEMBLY AND METHOD OF ASSEMBLING THE SAME

BACKGROUND OF THE INVENTION

The present invention is directed generally to electrical connectors and, in particular, to improved electrical connector assemblies which are couplable to electrical devices mountable on, for example, an automotive windshield for use in providing electric power to such devices.

A variety of approaches have been proposed for purposes of coupling electrical power to windshields and/or appliances, such as rearview mirror unit connected thereto. One of these approaches is described in U.S. Pat. No. 4,415,196 and discloses the use of strips of electrical conducting materials formed on the exterior surface of a window pane tempered glass for supplying electrical power from an external source to a rear window of windshield wiper. It is also known to provide a rearview mirror and light assembly for automotive windshields with electric power, such as is described in U.S. Pat. No. 4,646,210. This latter patent discloses an approach wherein electrical power is supplied to a rearview mirror and light assembly by virtue of a visible external connector assembly. Several drawbacks are associated with this approach. One is that the electrical connector assembly is visible and aesthetically somewhat out-of-place in the vehicle compartment. Not only is such exposure generally unaesthetic, it is perhaps a potential safety hazard should the electrical connector assembly not be securely connected. In addition, such external electrical connector assemblies because of their many parts and the labor intensive assembly associated therewith tend to be somewhat expensive in manufacture and assembly.

Therefore, it is desirable to provide an electrical connector assembly for coupling electric power to, for example, a rearview mirror and light assembly which avoids external electrical connectors which otherwise detract from vehicle aesthetics and which are more reliable, and safer to manufacture and assemble than known approaches.

SUMMARY OF THE INVENTION

In accordance with the present invention there is provided an improved vehicular electrical connector assembly for an automotive appliance, such as a rearview mirror and light assembly. This connector assembly is adapted for use on a vehicular laminated window having electrical conducting strips on a surface thereof which are couplable between a source of power and a rearview mirror and light assembly. The electrical connector assembly includes a mounting button adhesively securable directly to the surface of the vehicular window. A pair of electrical terminals is, preferably, positioned within a recess formed by the mounting button for facilitating electrical connection between them and the strips. The electrical terminals are coupled to terminals on the rearview mirror and light assembly. The button also directly mounts the mirror and light assembly to the window. The present invention also envisions a method of assembling the foregoing connector assembly for automobile window.

Accordingly, among the objects which are provided by the present invention are the following: an improved electrical connector assembly which electrically couples an electrical device directly to a vehicular window; an improved electrical connector assembly mountable directly on a windshield for allowing direct electrical coupling of a rearview mirror and light assembly to an automobile power source; an improved electrical connector assembly for providing a secure yet releasable electrical connection for a rearview mirror and light assembly; an automotive laminated windshield; an improved electrical connector assembly of the foregoing type which enhances the aesthetics and relative safety of electrical connector assemblies for a rearview mirror and light assemblies; an improved electrical connector assembly which is simple and economical to make and assemble.

Other objects and the full scope of the present invention will become apparent upon review of a detailed description to follow when taken in conjunction with the accompanying drawings in which like parts are designated by like reference numerals throughout the several views.

DETAILED DESCRIPTION

Figure 1:
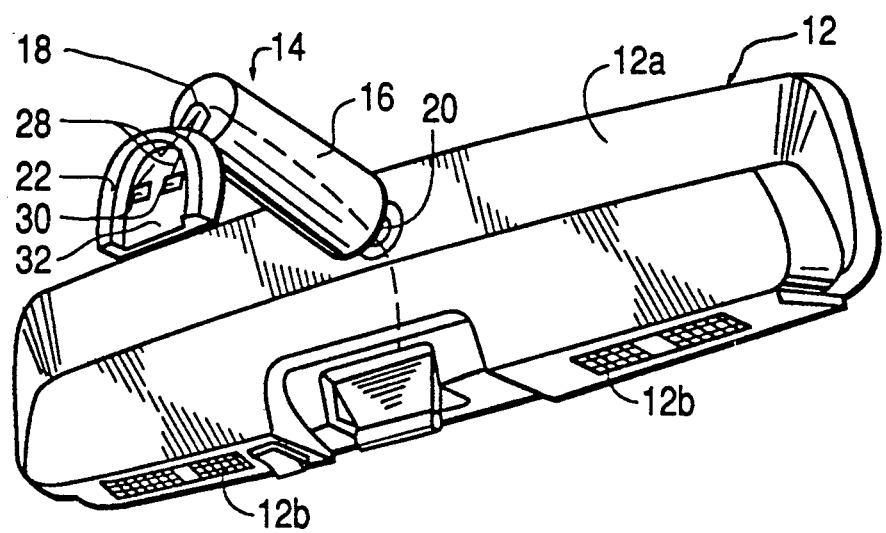
FIG. 1 is a perspective view of a rearview mirror and light assembly forming an aspect of the improved electrical connection assembly of the present invention.
Figure 2:
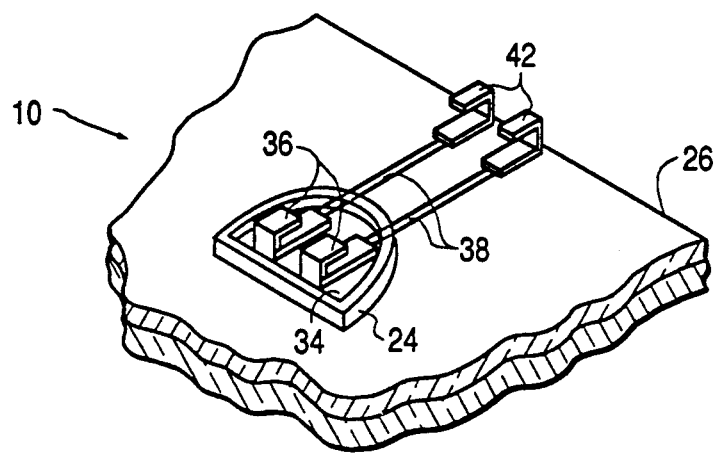
FIG. 2 illustrates an enlarged fragmented view of one improved embodiment of an electrical connector assembly made in accordance with the present invention.
Figure 3:
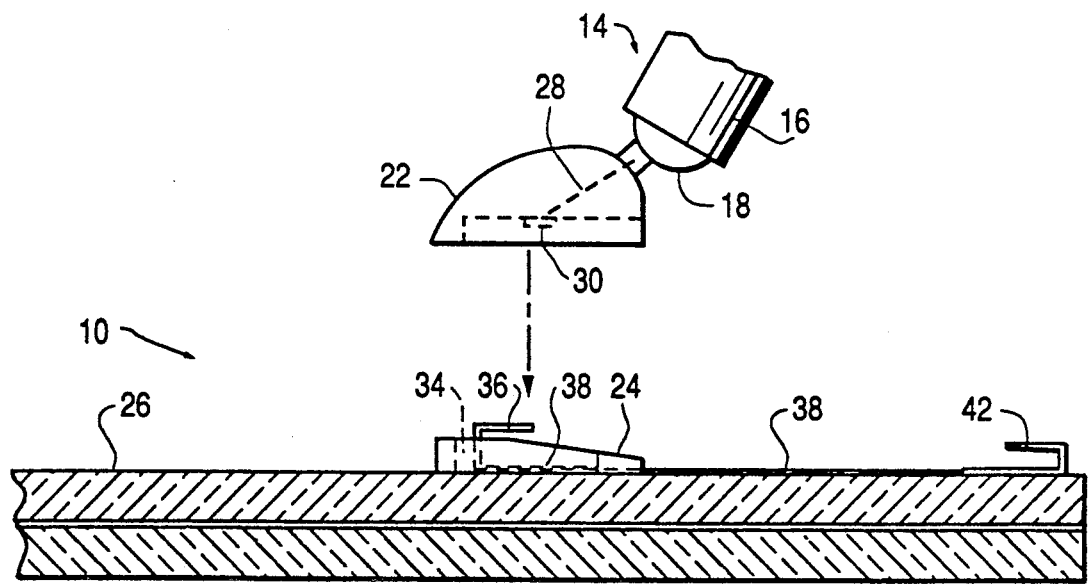
FIG. 3 illustrates another view of an electrical connector assembly of present invention; and, FIG. 4 is a flow chart depicting one preferred method of forming a laminated windshield having the connector assembly formed thereon.

Reference is made initially to FIGS. 1-3 which disclose one preferred embodiment of an electrical connector assembly of the present invention which is generally designated by reference numeral 10. The electrical connector assembly 10 is to be electrically coupled to a rearview mirror and light assembly 12, the latter can be any one of a wide variety known in the art, for instance, such that described in U.S. Pat. No. 4,646,210. Details of the construction of such a rearview mirror and light assembly are unnecessary for the present invention. Only those features necessary for understanding of the present invention will be described. Basically, the rearview mirror and light assembly 12 includes a housing 12a for sources 12b of artificial illumination and suitable switches which function to provide desired lighting.

As seen in FIGS. 1 and 3 the rearview mirror and light assembly 12 includes a mounting bracket assembly 14 which includes a cylindrical member 16 having connected at opposite ends thereof a ball joints member 18 and 20. The ball joint member 18 is articulated to a casted support member 22 which is constructed for releasable slidable connection with a window retainer button 24 as will be described.

The mirror retainer button 24 is adhesively mounted on an interior surface of a laminated windshield 26 and serves to support releasably the rearview mirror and light assembly 10 in a known manner. As noted, the rearview mirror and light assembly incorporates suitable reading or map and/or courtesy lighting elements. In this embodiment, the rearview mirror and light assembly has its internal electrical components connected by a pair of lead wires 28 to contact female terminals 30 constructed to the casted support member 22 is provided with a recessed area 32 that receives the exposed pair of electrical terminals 30.

Reference is made back again to the mirror retainer button 24. In this embodiment, it is provided with a recessed area 34 that encompasses a pair of conventional male electrical terminals 36. The terminals 36 are adapted to have sliding electrical contact with the terminals 30 that are mounted in the support member 22. Each of the terminals 36 have a base soldered to a corresponding one of a pair of electrically conductive strips 38 that are formed in an inner panel surface of the laminated windshield 26, as will be described. The electrically conductive strips 38 are preferably connected to respective ones of electrical terminals 42 that are mounted adjacent the marginal edge.

The conductive strips 38 are formed in the surface of the inner panel, such as by heat bonding or burning it into the surface of the glass pane in a known manner. The strips 38 are basically formed of a silver-type enamel applied by a screen printing process, whereby the conducting strips are deposited and heat treated so as to become integral with the surface of the glass pane. The conductive strips 38 are comprised of metallic silver particles in an sufficient amount to ensure electrical conductivity so as to supply the requisite power necessary for the rearview and light assembly 12. The silver printing of the strips onto the glass is accomplished after the silver paste forming the leads is printed onto the flat piece of glass plate. Thereafter, the flat piece of glass plate is heated, molded and contoured into a desired configuration whereby the silver enamel paste forms the external lead integral with the glass surface.

In another preferred embodiment, the laminated windshield 26 is provided with selected shaded areas (not shown) which provide sufficient opacity to block, if desired. the button 24 and conductive strips 38 from being visible from the other side of the windshield.

Figure 4:
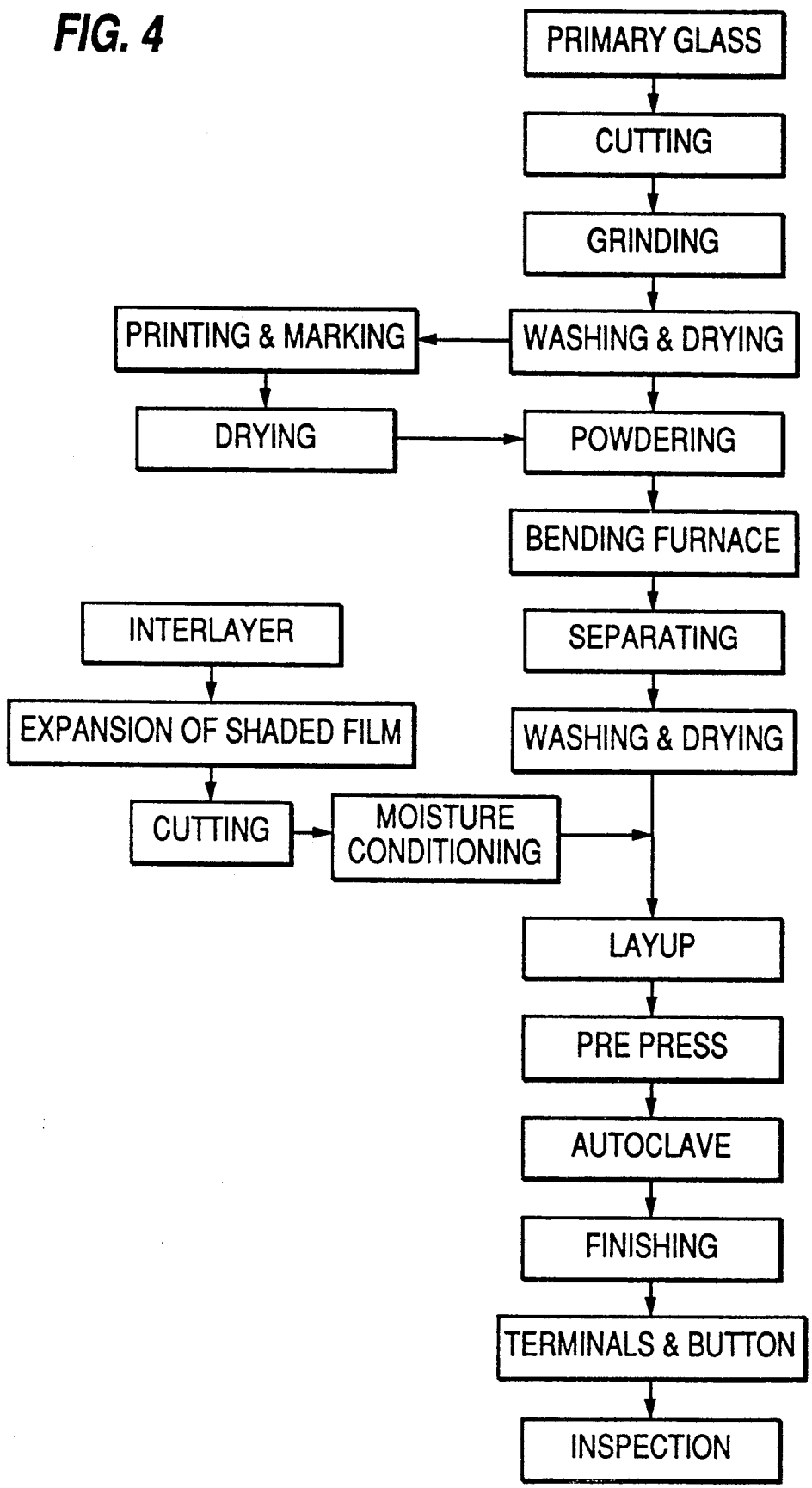

Now reference is made to FIG. 4 for describing a series of process steps which can be undertaken in forming an electrical connector assembly for a windshield made in accordance with the principles of the present invention. It will be appreciated that the art of forming and shaping windshields is known. In this embodiment, a primary glass element adapted for an automobile windshield is suitably cut and then ground to a desired configuration and size. After conventional washing and drying steps, the primary glass element is subjected to a screen printing process for depositing a silver particle type enamel paste thereon in desired locations consistent with the location of strips. Following these known printing and marking steps, there is a conventional drying step which permits the silver particle enamel paste to dry and it is dried onto the surface. Thereafter, a conventional powdering step is performed prior to introducing the primary glass element into a bending furnace (not shown) for the typical bending process. The primary glass element is removed and then suitably washed as well as dried in a known manner. Thereafter, an interlayer of suitable plastic is placed on the primary glass element and opaque shaded film is expanded and cut. Suitable moisture conditioning steps are followed. Thereafter, an exterior layer is placed on the interior layer with mirror button and prepressed together prior to an autoclaving and finishing process steps. As a result of the foregoing, there is provided a windshield having the printed leads on it as described. Thereafter, the terminals are soldered onto the interior glass panel in a manner described above.

Changes may be made in the construction and operation of various elements, parts, and assemblies described herein and changes may be made in the steps or the sequence of steps of forming the connector assembly described herein without departing from the spirit and scope of the invention as defined in the following claims.

What is claimed is:

1. An electrical connector assembly for electrically coupling a rearview mirror and light assembly directly to a vehicular window, said assembly comprising:
    a rearview mirror and light assembly including mounting means and a first set of electrical terminal means in said mounting means;
    a second set of electrical terminal means directly adhesively secured to a surface of said vehicular window, said second set of electrical terminal means being constructed for slidable electrical coupling to said first set of terminal means;
    mounting bracket means mounted on said surface of said vehicular window for encompassing said second set of terminal means, said bracket means being constructed for mounting said rearview mirror and light assembly directly thereon and coupling said first and second set of terminal means; and,
    electrically conductive strip means directly attached to said surface of said vehicular window for electrically connecting said second set of terminal means to a source of electrical power therefor.

2. The connector assembly of claim rather including a third set of terminal means mounted directly on said surface of said vehicular laminated window for electrical connection with said second set of terminal means by said conductive strip means so as to supply electrical power to said rearview mirror and lighting assembly.

3. The assembly of claim 2 wherein said mounting bracket means includes a rearview mirror mounting button assembly, wherein said button assembly has a recess therein which is adapted to surround said second set of terminal means.

4. The assembly of claim 3 wherein said conductive means includes a pair of electrically conductive strips which are embedded into said surface of said vehicular window and extend beneath said mirror mounting button.

5. A method of removably electrically coupling a rearview mirror and light assembly directly to an automotive window, said method comprising the steps of:
    providing a vehicular window;
    providing a rearview mirror and light assembly having mounting means and a first pair of electrical terminals within the mounting means;
    securing a second set of electrical terminals directly to an interior surface of the vehicular window;
    securing mounting means mounted on the interior window surface for encompassing the second set of terminals which are couplable to the first set of terminals and which mounting means directly mounts the rearview mirror assembly to the window; and,
    providing conductive strips directly attached to the interior window surface for connecting the second set electrical terminals to a source of electrical power.

6. The method of claim further comprising the step of providing a third pair of terminals mounted on the window surface for purposes of supplying electrical power through the conductive strips to electrical components of the rearview mirror and lighting assembly.

7. The method of claim herein said step of providing strips includes providing a silver particle enamel paste which is baked into the window.

8. The method of claim 7 wherein said step of providing conductive strips includes providing the strips so as to extend beneath the mounting means.

9. A method of removably electrically coupling a rearview mirror and light assembly directly to an automotive laminated window, said method comprising the steps of:

providing a vehicular laminated window;

providing a rearview mirror and light assembly having mounting means and a first pair of electrical terminals within the mounting means;

securing a second set of electrical terminals directly to an interior surface of the vehicular window;

securing mounting means mounted directly to the interior window surface for encompassing the second set of terminals which are couplable to the first set of terminals and which mounting means directly mounts the rearview mirror assembly to the window; and, providing conductive strips on the window surface for connecting the second set of electrical terminals to a source of electrical power.

* * * * *